US008199928B2

(12) United States Patent
Schmidt et al.

(10) Patent No.: US 8,199,928 B2

(45) Date of Patent: Jun. 12, 2012

(54) SYSTEM FOR PROCESSING AN ACOUSTIC INPUT SIGNAL TO PROVIDE AN OUTPUT SIGNAL WITH REDUCED NOISE

(75) Inventors: Gerhard Uwe Schmidt, Ulm (DE); Raymond Brückner, Blaustein (DE); Markus Buck, Biberach (DE); Ange Tchinda-Pockem, Darmstadt (DE); Mohamed Krini, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1069 days.

(21) Appl. No.: 12/118,205

(22) Filed: May 9, 2008

(65) Prior Publication Data

US 2008/0304679 A1 Dec. 11, 2008

(30) Foreign Application Priority Data

May 21, 2007 (EP) ..................................... 07010091

(51) Int. Cl.
*H04B 15/00* (2006.01)

(52) U.S. Cl. ..................... 381/94.1; 381/94.2; 381/94.3; 704/226; 704/227; 704/228; 704/E11.003; 704/E21.004

(58) Field of Classification Search ........ 381/94.1–94.3; 704/226–228, 233, E11.003, E21.004
See application file for complete search history.

(56) References Cited

U.S. PATENT DOCUMENTS

| | | | | |
|---|---|---|---|---|
| 6,453,289 | B1 * | 9/2002 | Ertem et al. | 704/225 |
| 2003/0128851 | A1 * | 7/2003 | Furuta | 381/94.2 |
| 2004/0049383 | A1 * | 3/2004 | Kato et al. | 704/226 |
| 2004/0186711 | A1 * | 9/2004 | Frank et al. | 704/226 |

FOREIGN PATENT DOCUMENTS

| | | | |
|---|---|---|---|
| WO | WO 01/13364 | A1 | 2/2001 |
| WO | WO 01/37265 | A1 | 5/2001 |

OTHER PUBLICATIONS

IEEE Transactions on Acoustics, Speech, and Signal Processing, vol. 32, No. 6, pp. 1109-1121, Dec. 1984.*

Hänsler, E. et al. Chapter 5, "Acoustic Echo and Noise Control: A Practical Approach" *John Wiley & Sons, Inc.*, Hoboken, NJ (USA), 2004, 36 pages.

Vaidyanathan, P. P., "Multirate Systems and Filter Banks", *Prentice Hall*, Englewood Cliffs, NJ (USA), 2006, Book.

Vary, P. et al., Chapter 11, "Single and Dual Channel Noise Reduction" *Digital Speech Transmission: Enhancement, Coding and Error Concealment*, 2006, pp. 389-408.

Ephraim, Y. et al., "Speech Enhancement Using a Minimum Mean-Square Error Short-Time Spectral Amplitude Estimator", *IEEE Trans. Acoust. Speech Signal Process.*, vol. 32, No. 6, 1984, pp. 1109-1121, and vol. 33, No. 2, 1985, pp. 443-445.

Linhard, K. et al., "Spectral Noise Subtraction with Recursive Gain Curves", *ICSLP* '98, Conference Proceedings, No. 4, pp. 1479-1482.

Martin, R., "Noise Power Spectral Density Estimation Based on Optimal Smoothing and Minimum Statistics", *IEEE Trans. Speech Audio Process.*, vol. T-SA-9, No. 5, 2001, pp. 504-512.

Puder, H. et al., "An Approach for an Optimized Voice-Activity Detector for Noisy Speech Signals", *EUSIPCO* '02, Conference Proceedings No. 1, pp. 243-246.

T. Lotter, P. Vary, "Noise Reduction by Joint Maximum a Posteriori Spectral Amplitude and Phase Estimation with Super-Gaussian Speech Modelling", EUSIPCO '04, Conference Proceedings, No. 2, pp. 1457-1460.

* cited by examiner

*Primary Examiner* — Hrayr A Sayadian

(74) *Attorney, Agent, or Firm* — Sunstein Kann Murphy & Timbers LLP

(57) ABSTRACT

An apparatus processes an acoustic input signal to provide an output signal with reduced noise. The apparatus weights the input signal based on a frequency-dependent weighting function. A frequency-dependent threshold function bounds the weighting function from below.

11 Claims, 13 Drawing Sheets

SYSTEM FOR PROCESSING AN ACOUSTIC INPUT SIGNAL TO PROVIDE AN OUTPUT SIGNAL WITH REDUCED NOISE

PRIORITY CLAIM

This application claims the benefit of priority from European Patent Application EP 07010091.2, filed May 21, 2007, which is incorporated by reference.

FIELD OF INVENTION

1. Technical Field

The invention relates to acoustic signal processing for noise reduction.

2. Background of the Invention

Noise suppression has many applications. Some hands-free telephony systems rely on noise suppression methods to suppress noise when in environments such as within a vehicle. In these environments, a desired signal, such as a speech signal, may be disturbed by interferences from many sources.

SUMMARY

A method processes an acoustic input signal to reduce noise. The input signal is weighted with a frequency-dependent weighting function. A frequency-dependent threshold function provides lower bounds for the weighting function.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The method and apparatus may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
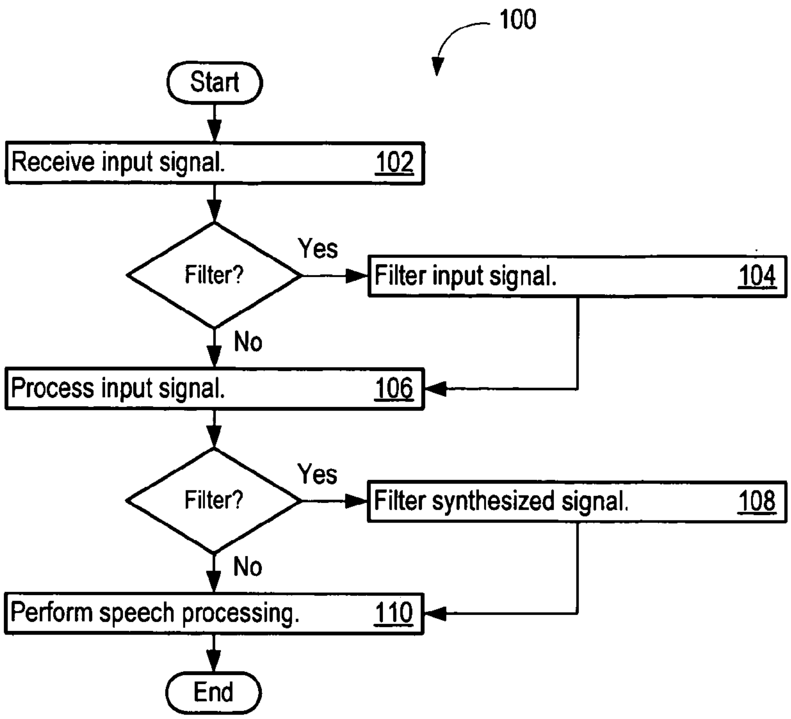
FIG. 1 is a flow diagram of a speech recognition input process.

FIG. 1 is a process 100 that conditions speech. The process 100 receives an input signal (102). The input signal may be received from a device that converts sound into analog signals or digital data, or may be received from an array of devices. In some systems, the signals may be received from a microphone or microphone array that interfaces a hands-free system. In another system the input signal may be a digital signal.

Through hardware or software, the process 100 may selectively pass certain elements of a signal while attenuating (dampen) signal elements above it (e.g. a low-pass filter), elements below it (e.g. a high-pass filter), or those above and below it (e.g. a band-pass filter). The input signal may be filtered (104). The filtering may process the signal in one or more stages. For example, the input signal may be conditioned by a beamforming process and/or may transmit characteristics above and below it (e.g. a band-pass filter).

The input signal may be processed to reduce noise in the signal (106). The process may process the input signal through a Wiener filter, spectral subtraction, recursive gain curves, or other methods or systems. Alternatively, the processing may involve more flexible approaches that may adapt to changing environmental conditions.

The processed signal may be filtered (108) at a later stage that may occur through one or more processes. These processes may include a process that passes signals within a pass band. The processed signal may be further processed through a speech processing (110). The speech processing may include speech recognition processing. For example, the processed signal may be used to activate, manipulate, and/or control a device, such as a mobile telephone system, wireless communications device, or a vehicle stereo assembly. The noise-reduced signal may reduce misrecognitions in the activation, manipulation, and/or control of the device.

Figure 2:
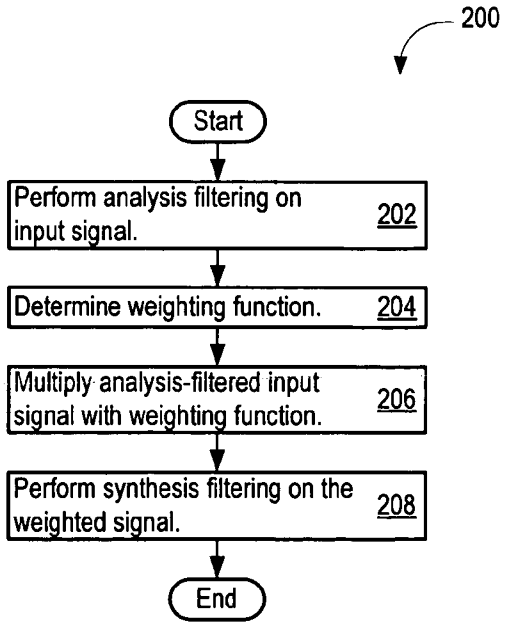
FIG. 2 is a flow diagram of a noise reduction process.

FIG. 2 is a process 200 that may reduce noise in an acoustic signal. The process 200 may provide a more flexible noise suppression approach. The process 200 receives an input signal that may be converted into an analog signal or digital data. The input signal may be processed by a signal processing technique that may use sensor arrays to detect or estimate a signal of interest. The technique may include an adaptive spatial filtering and interference rejection (e.g. a beamformer) and/or a band-pass filtering process. The input signal may include a wanted signal component and a noise signal component, the latter representing a disturbance in the signal.

One or more microphones may receive an acoustic signal that is converted into a discretized microphone signal $y(n)$, where $n$ denotes a time index. The signal $y(n)$ may have passed through one or more filtering processes. The input signal y(n) may be comprised of a wanted signal component s(n) and a noise component b(n):

$$y(n)=s(n)+b(n).$$

The wanted signal component may be a speech signal.

The input signal may be processed through an analysis filter bank (202). The analysis filter bank may convert the input signal into its frequency domain components. Some analysis filter banks may process the input signal using a Discrete Fourier Transform (DFT) function, Discrete Cosine Transform (DCT) function, a polyphase filter bank, a gammatone filter bank, or other functions or filters. The analysis filter bank may separate the input signal into frequency sub-bands or short-time spectra. In some processes, the analysis filter bank may process the input signal y(n) into input sub-band signals or short-time spectra $Y(e^{j\Omega_\mu},n)$. $\Omega_\mu$ are the discrete frequency sampling points as determined by the analysis filter bank, where $$\mu\epsilon\{0, 1, \ldots, M-1\}.$$

M is the number of selected sub-bands. The sub-band signals may be re-determined every r cycles. In one process, the number of sub-bands M may be 256 and the frame displacement r may be 64.

The analysis filter bank may process the input signal using a window function, such as a Hann window. While many window lengths may be used, in some processes a window length of 256 is used.

The processed signal may determine a weighting function, attenuation factors, or damping factors (204). The weighting function may be frequency-dependent and/or time-dependent. For example, the weighting function may include a different weight for different frequency sub-bands. The weighting function may take the form $G(e^{j\Omega_\mu},n)$, where the weighting function is both time (n) and frequency ($\Omega_\mu$) dependent.

The weighting function may be based on a maximum of a threshold function and a predetermined filter characteristic. This choice creates a weighting function with a lower bound. The filter characteristic may not be restricted to values above a certain threshold. Alternatively, the filter characteristic may be time-dependent. Time-dependency may permit adaptation of the weighting function to detected ambient conditions.

In some processes, the weighting function may be based on a Wiener characteristic. The Weiner characteristic may be included in the filter characteristic. In other processes, the weighting function may be based on an Ephraim-Malah algorithm, a Lotter algorithm, or other filter characteristics.

In other processes, the weighting function may be based on an estimated power density spectrum of a noise signal component and/or an estimated power density spectrum of the input signal. A weighting function may be based on a quotient of power density spectra. The estimated power density spectrum of the input signal may be determined as an absolute value squared of a vector containing the current sub-band input signals as coefficients.

At 206, the processed input signal is weighted by the weighting function. The weighting function may be applied by a multiplication on individual sub-bands. For example, the weighting function $G(e^{j\Omega_\mu},n)$ may be multiplied with the input sub-band signals $Y(e^{j\Omega_\mu},n)$:

$$\hat{S}_g(e^{j\Omega_\mu},n)=Y(e^{j\Omega_\mu},n)G(e^{j\Omega_\mu},n).$$

The sub-band signals $\hat{S}_g(e^{j\Omega_\mu},n)$ are estimates for the undisturbed wanted sub-band signals $S(e^{j\Omega_\mu},n)$. For example, the undisturbed wanted sub-band signals may be the portion of a voice command at a sub-band frequency $\Omega_\mu$ at a time n.

The weighted signal is processed with a synthesis filter bank (208). The sub-band signals $\hat{S}_g(e^{j\Omega_\mu},n)$ may be combined by the synthesis filter bank to obtain an output signal $\hat{S}_g(n)$. This output signal $\hat{S}_g(n)$ may be filtered and/or analyzed to detect or recognize speech.

Figure 3:
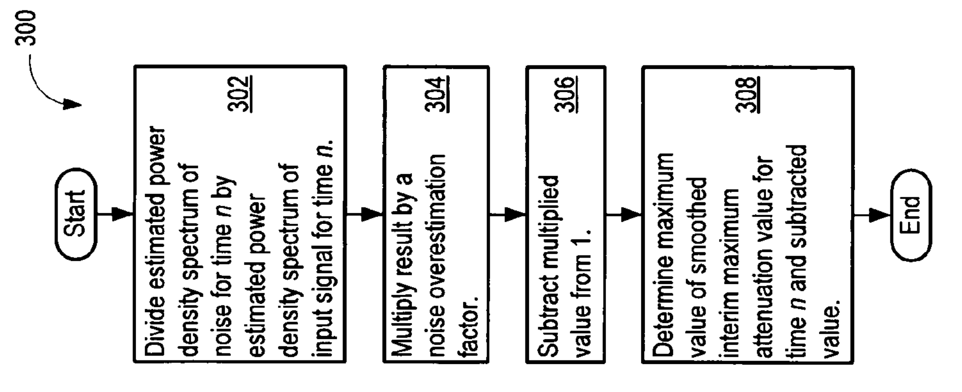
FIG. 3 is a flow diagram of a weighting function determination process.

FIG. 3 is a process 300 that determines a weighting function. The process 300 obtains an estimated power density spectrum of noise in an input signal, an estimated power density spectrum of the input signal, a noise overestimation factor, and an interim maximal attenuation. The weighting function and/or these values may be frequency-dependent and/or time-dependent.

The estimated power density spectrum of the noise may be determined using a temporal smoothing of the sub-band powers of the current input signal. This smoothing may be performed during speech pauses. During speech activity, no smoothing may take place. Alternatively, a minimum statistics may be performed for which no speech pause detection is required. In some situations, an initial value for the estimated power density spectrum of the noise may be measured in a first vehicle and may be expressed as $S_{bb,target}(e^{j\Omega_\mu})$. If this initial target noise is then employed in a different vehicle, the residual noise of this different vehicle may be matched to the residual noise of the first vehicle in a level-adjusted way.

The estimated power density spectrum of the input signal may be derived directly from input sub-band signals. The estimated power density spectrum of the input signal may be the square of the absolute value of the input sub-band signal. The estimated power density spectrum of the input signal $\hat{S}_{yy}(\Omega_\mu,n)$ may be calculated from the input sub-band signals $Y(e^{j\Omega_\mu},n)$:

$$\hat{S}_{yy}(\Omega_\mu, n) = |Y(e^{j\Omega_\mu}, n)|^2.$$

The estimated power density spectrum of noise is divided by the estimated power density spectrum of the input signal (302). This division may be performed on the estimations for a time n and/or for a frequency $\Omega_\mu$. For example, the estimated power density spectrum of noise $\hat{S}_{bb}(\Omega_\mu,n)$ may be divided by the estimated power density spectrum of the input signal $\hat{S}_{yy}(\Omega_\mu,n)$ to produce the ratio $$\frac{\hat{S}_{bb}(\Omega_\mu, n)}{\hat{S}_{yy}(\Omega_\mu, n)}.$$

The resulting ratio is multiplied by the noise overestimation factor (304). The noise overestimation factor may be time-dependent and/or frequency dependent. For example, the noise overestimation factor may be expressed as $\beta(e^{j\Omega_\mu},n)$, so the resulting multiplied value is $$\beta(e^{j\Omega_\mu}, n)\frac{\hat{S}_{bb}(\Omega_\mu, n)}{\hat{S}_{yy}(\Omega_\mu, n)}.$$

The multiplied value is subtracted from the value one (306). For example, the resulting subtracted value may be $$1-\beta(e^{j\Omega_\mu},n)\frac{\hat{S}_{bb}(\Omega_\mu,n)}{\hat{S}_{yy}(\Omega_\mu,n)}.$$

The subtracted value is compared against an interim maximal attenuation value, and the maximum of the two values is selected (308). This selection reflects a threshold function where either the interim maximal attenuation value or the subtracted value may serve as a lower bound. The interim maximal attenuation value may be expressed as $G_{min}(e^{j\Omega_\mu},n)$. This interim maximal attenuation value may be determined according to the process of FIG. 4. This selected value may be used as a weight or attenuation factor or damping factor. For example, where the weighting function expresses a Wiener characteristic, the weighting function for the input signal may be:

$$G(e^{j\Omega_\mu},n)=\max\left\{G_{min}(e^{j\Omega_\mu},n),\ 1-\beta(e^{j\Omega_\mu},n)\frac{\hat{S}_{bb}(\Omega_\mu,n)}{\hat{S}_{yy}(\Omega_\mu,n)}\right\}.$$

This weighting function reflects a threshold function where the weighting function does not drop below the interim maximal attenuation function $G_{min}(e^{j\Omega_\mu},n)$. In other words, the weighting function has a lower bound or is bounded below by the interim maximal attenuation function $G_{min}(e^{j\Omega_\mu},n)$. A threshold function determined in this way does not need to be used in the context of a Wiener characteristic. The threshold function may employ the Ephraim-Malah algorithm or the Lotter algorithm. The threshold function may be a time-dependent function. A time-dependent adaptation may respond not only to different frequencies but also to time-varying conditions.

The threshold function may be based on a target noise spectrum. The residual noise, such as the noise in the output signal after the weighting step, may be controlled. The method may be configured such that the residual noise approaches or converges to a target noise spectrum according to a predetermined criterion or measure.

The target noise spectrum may be time-dependent. The target noise spectrum may be adapted to varying conditions including any background noise. A time dependent target noise spectrum may be obtained through a time-independent initial target noise spectrum and adapting or modifying the initial target noise spectrum according to a predetermined criterion. Such an adaptation may be performed, for example, using a predetermined adaptation factor which may be time-dependent.

The target noise spectrum may be adapted. The adaptation may include performing wanted signal detection and adapting the target noise spectrum if no wanted signal is detected. Adapting the target noise spectrum may include adapting the overall power of the target noise spectrum.

Adapting the target noise spectrum may adapt the power of the target noise spectrum. The overall power of the input signal may be adapted. The target noise spectrum at time n may be incremented if the power of the target noise spectrum at time (n−1) within a predetermined frequency interval is smaller than a predetermined attenuation factor times the power of an estimate of a noise component in the input signal at time n within the predetermined frequency interval.

Incrementing the target noise spectrum may include multiplying the target noise spectrum by a predetermined incrementing factor, where the incrementing factor is greater than one. The target noise spectrum at time n may be decreased or decremented when the power of the target noise spectrum at time (n−1) within a predetermined frequency interval is greater than or equal to a predetermined attenuation factor times an estimate of the power of a noise component in the input signal at time n within the predetermined frequency interval. The target noise spectrum may be decreased by multiplying the target noise spectrum by a predetermined decrementing factor. The predetermined attenuation factor and/or the predetermined frequency interval for the decrementing act may be about equal to the respective attenuation factor and frequency interval for the incrementing step. This process may produce an adaptation to the overall power of the input signal where the general form of the target noise spectrum is not changed.

The threshold function may be based on the minimum of a predetermined minimum attenuation value and a quotient of the target noise spectrum and the absolute value of the input signal. This process may account for the current power of the input signal and may provide a minimal weighting, attenuation, or damping. The threshold function may be equal to a minimum. The threshold function may be based on the maximum of this minimum and a predetermined maximum attenuation value. This process may produce a (time-dependent) upper and lower bounds. The threshold function may be equal to this maximum.

The threshold function at time n may be based on a convex combination of the threshold function at time (n−1) and a maximum at time n. The convex combination may produce a more natural residual noise. A convex combination is a linear combination where the coefficients are non-negative and sum up to one. The threshold function obtained in this way is based more on a recursive smoothing. The threshold function at time n may be equal to this convex combination.

The threshold function may be based on two or more target noise spectra. Using more than one target noise spectrum allows the process to distinguish between different ambient conditions. When used to suppress noise in a hands-free system or a vehicle cabin, a first noise spectrum may be used for a lower speed of the vehicle (e.g., below a predetermined threshold), and a second target noise spectrum may be used for a higher speed. A third target noise spectrum may be used for a medium vehicle speed. The noise suppression system may switch from one target noise spectrum to another.

The weighting function may be adapted. A wanted signal may be detected, and the weighting function may be adapted when a wanted signal is not detected. This selected adaptation may account for changing ambient or environmental conditions.

Adapting the weighting function may comprise adapting the power of the weighting function or may be limited to adapting the overall power of the weighting function. Except for the overall power (e.g. the power over the whole frequency range), the weighting function may not be modified. The adapting may be performed with respect to the overall power of the input signal.

Any of the changes may be made in the frequency domain. At least one of the changes may be performed in separate frequency sub-bands. For example, adapting the target noise spectrum and/or determining the above-mentioned minima and/or maxima may be performed for each frequency sub-band.

Figure 4:
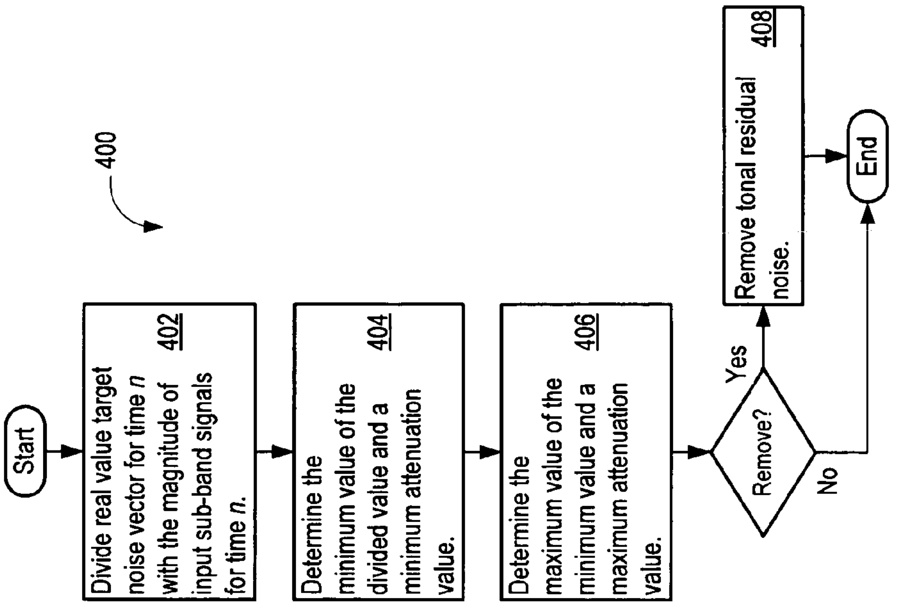
FIG. 4 is a flow diagram of an interim maximal attenuation factor determination process.

FIG. 4 is a process 400 that determines an interim maximal attenuation factor. The process 400 obtains a real value target noise vector, input sub-band signals, a minimum attenuation value, and a maximum attenuation value. These values may be frequency-dependent and/or time-dependent. A real value target noise vector may be determined according to the process of FIG. 5. The input sub-band signals may be received from an analysis filter bank.

Obtaining the real value target noise vector may involve determining the overall amplification or power of a target noise. The determination of the overall amplification or power of a target noise may be adapted to current background noise conditions, and speech activity detection may occur. A multiplicative adaptation may be performed for those signal frames for which in the preceding frame no speech activity had been detected. However, if speech activity had been detected, no adaptation of the target noise may take place.

The real value target noise vector is divided by the magnitude of the input sub-band signals (402). The real value target noise vector and the magnitude of the input sub-band signals may be frequency and time dependent. For example, division of the real value target noise vector $B_{target}(e^{j\Omega_\mu},n)$ by the magnitude of the of the input sub-band signals $Y(e^{j\Omega_\mu},n)$ produces the ratio $$\frac{B_{target}(e^{j\Omega_\mu}, n)}{|Y(e^{j\Omega_\mu}, n)|}.$$

The ratio is compared against a minimum attenuation value, and the minimum of the two values is selected (404). The minimum attenuation value may be a constant. Selecting the minimum attenuation value such as a constant may assure that an attenuation value equal to that constant will always be present. The minimum attenuation value may be represented as $G_0$.

The selected minimum value is compared against a maximum attenuation value, and the maximum of those two values is selected (406). The maximum attenuation value may be a constant. Selecting the maximum attenuation value as a constant may assure that a maximal attenuation will be bounded. The maximum attenuation value may be represented as $G_1$. This maximum attenuation value may represent an interim maximal attenuation. The interim maximal attenuation may correspond with a lower bound for the weighting function. For example, the interim maximal attenuation $\tilde{G}_{min}(e^{j\Omega_\mu},n)$ may be determined as:

$$\tilde{G}_{min}(e^{j\Omega_\mu}, n) = \max\left\{G_1, \min\left\{G_0, \frac{B_{target}(e^{j\Omega_\mu}, n)}{|Y(e^{j\Omega_\mu}, n)|}\right\}\right\}$$

Selecting $G_0=0.5$ and $G_1=0.05$ produces a minimal attenuation of about 6 dB and a maximum attenuation of about 26 dB.

The interim maximal attenuation may be processed to remove tonal residual noise (408). The selection of the maximum attenuation value may produce a tonal residual noise when used for a noise reduction characteristic. The tonal residual noise may occur because only small variations in the absolute value of the output signal are allowed and only the phase is varied. When these criteria are not met, an unnatural sound may occur.

The tonal residual noise may be avoided by using artificial level variations. These variations may be introduced through a random number generator. In other processes, the tonal residual noise may be avoided by using temporary level variations of the disturbed input signal (in whole or in part). Tonal residual noise may be removed via a recursive smoothing of the interim maximal attenuation:

$$G_{min}(e^{j\Omega_\mu},n)=\gamma G_{min}(e^{j\Omega_\mu},n-1)+(1-\gamma)\tilde{G}_{min}(e^{j\Omega_\mu},n).$$

For the constant $\gamma$ used for the coefficients in this convex combination:

$$0\leqq\gamma\leqq 1.$$

Where $\gamma$ is small, only some level variations may occur. For small $\gamma$, the residual noise may be tonal but may largely correspond to the target noise spectrum. For large $\gamma$, a more natural residual noise may be obtained, however, a correspondence with the target noise may be given only for medium and large time intervals. For example, one may choose $\gamma=0.7$. This process may produce an adaptive attenuation bound or lower threshold function which may be used in different kinds of characteristics for noise suppression.

Figure 5:
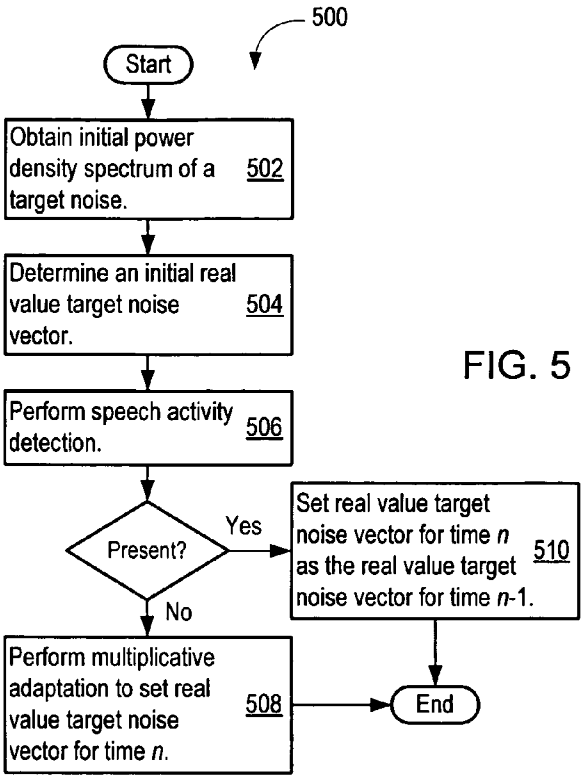
FIG. 5 is a flow diagram of a real value target noise vector determination process.

FIG. 5 is a process 500 that determines a real value target noise vector. The process 500 obtains an initial power density spectrum of a target noise (502). For example, the initial power density spectrum of a target noise $S_{bb,target}(e^{j\Omega_\mu})$ may be measured or detected. The initial power density spectrum may be a melodic noise obtained through comparison tests. Alternatively, the initial power density spectrum may correspond to the noise which had been used to train a speech recognition system. In this case, the speech recognition system may be used both in a training phase and an operation phase with a common residual noise.

An initial real value target noise vector is determined (504). The initial real value target noise vector may be calculated as a square root of the initial power density spectrum of the target noise. For example, based on the initial target noise power density spectrum, a real value target noise vector $B_{target}(e^{j\Omega_\mu},n)$ for the starting time (n=0) may be determined:

$$B_{target}(e^{j\Omega_\mu},0)=\sqrt{S_{bb,target}(e^{j\Omega_\mu})}$$

Speech activity is detected from an input signal (506). Speech activity may be encapsulated within a wanted signal. Wanted signal detection may occur, for example, by comparing a weighting function averaged over a predetermined frequency interval at time (n−1) and a predetermined threshold value. If the threshold value is exceeded, an adaptation may take place. Wanted signal detection may occur in other ways too. For example, voice activity detectors or voice activity detection algorithms may be used. The speech activity and/or wanted signal detection may be performed according to the process of FIG. 6.

Where speech activity is not detected, the process 500 performs a multiplicative adaptation to set the real value target noise vector (508). A previous value for a real value target noise vector may be multiplied by a correction factor. For example, a current value for the real value target noise vector $B_{target}(e^{j\Omega_\mu},n)$ may be set to a previous value for a real value target noise vector $B_{target}(e^{j\Omega_\mu},n-1)$ multiplied by a correction factor $\Delta_B(n)$ to produce $B_{target}(e^{j\Omega_\mu},n)=\Delta_B(n) B_{target}(e^{j\Omega_\mu},n-1)$. The correction factor may be calculated according to the process of FIG. 7. Alternatively, adapting the weighting function may be performed without such wanted signal detection; in such a case, for example, minimum statistics may be used.

Where speech activity is present, the process 500 sets a current real value target noise vector as a previous real value target noise vector (510). The current real value target noise vector may be set to the real value target noise vector immediately previous in time to the current real value target noise vector. For example, the current real value target noise vector $B_{target}(e^{j\Omega_\mu},n)$ may be set to the real value target noise vector directly adjacent in time prior to the current real value target noise vector $B_{target}(e^{j\Omega_\mu},n-1)$, such that $B_{target}(e^{j\Omega_\mu},n)=B_{target}(e^{j\Omega_\mu},n-1)$.

The combined effect of performing speech activity detection, setting a real value target noise vector when speech activity is not present, and setting a current real value target noise vector as a previous real value target noise vector when speech activity is present, may be represented as:

$$B_{target}(e^{j\Omega_\mu}, n) = \begin{cases} \Delta_B(n)B_{target}(e^{j\Omega_\mu}, n-1), & \frac{1}{M}\sum_{\mu=0}^{M-1} G(e^{j\Omega_\mu}, n-1) > K_G, \\ B_{target}(e^{j\Omega_\mu}, n-1), & \text{else.} \end{cases}$$

For this example, $$\frac{1}{M}\sum_{\mu=0}^{M-1} G(e^{j\Omega_\mu}, n-1) > K_G$$

may be the condition set for speech activity detection. This process may be recursively called and applied on an input signal stream.

Figure 6:
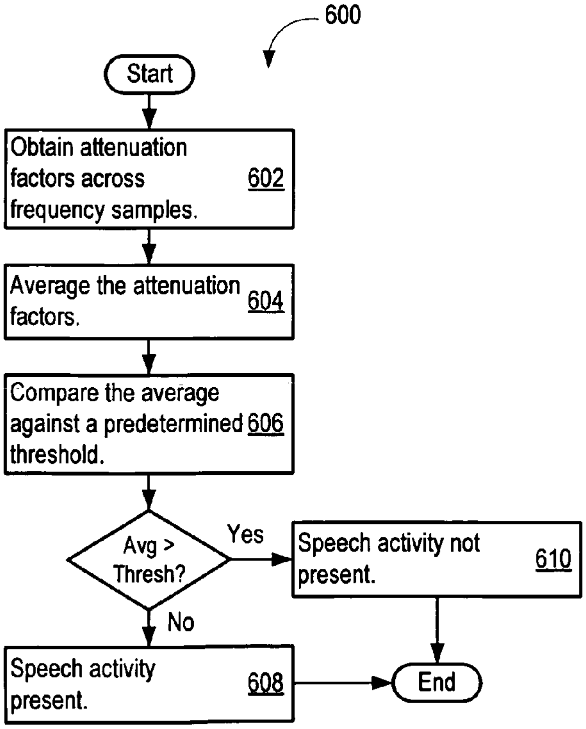
FIG. 6 is a flow diagram of a speech activity detection process.

FIG. 6 is a process 600 that detects speech activity. The process 600 obtains attenuation factors across frequency samples (602). The frequency samples may include the frequencies considered in a weighting function for an input signal. For example, where the weighting function is of the form $G(e^{j\Omega_\mu},n)$, the frequencies may span all frequencies $\Omega_\mu$ for $\mu\in\{0, 1, \ldots, M-1\}$, where M is the number of selected sub-bands for the weighting function. The attenuation factors may be averaged to produce a mean attenuation factor (604). Continuing the example, the mean attenuation factor may take the form $$\frac{1}{M}\sum_{\mu=0}^{M-1} G(e^{j\Omega_\mu}, n-1).$$

The mean attenuation factor may be compared against a predetermined threshold (606). The threshold value may be a constant. The mean attenuation factor $$\frac{1}{M}\sum_{\mu=0}^{M-1} G(e^{j\Omega_\mu}, n-1)$$

for a previous signal frame may be compared with a predetermined threshold value $K_G$, where $K_G$ may have a value of 0.5. The comparison may include determining whether the mean attenuation factor has a value greater than the predetermined threshold value. For example, the comparison may include determining whether $$\frac{1}{M}\sum_{\mu=0}^{M-1} G(e^{j\Omega_\mu}, n-1) > K_G.$$

Where the mean attenuation factor does not compare favorably to the predetermined threshold, speech activity is present (608). For example, the mean attenuation factor may not be greater than the predetermined threshold. This determination may result in setting a current real value target noise vector to the same value as a previous real value target noise vector. Where the mean attenuation factor compares favorably to a predetermined threshold, speech activity is not present (610). For example, the mean attenuation factor may be greater than the predetermined threshold. This determination may result in a multiplicative adaptation to set a real value target noise vector.

Figure 7:
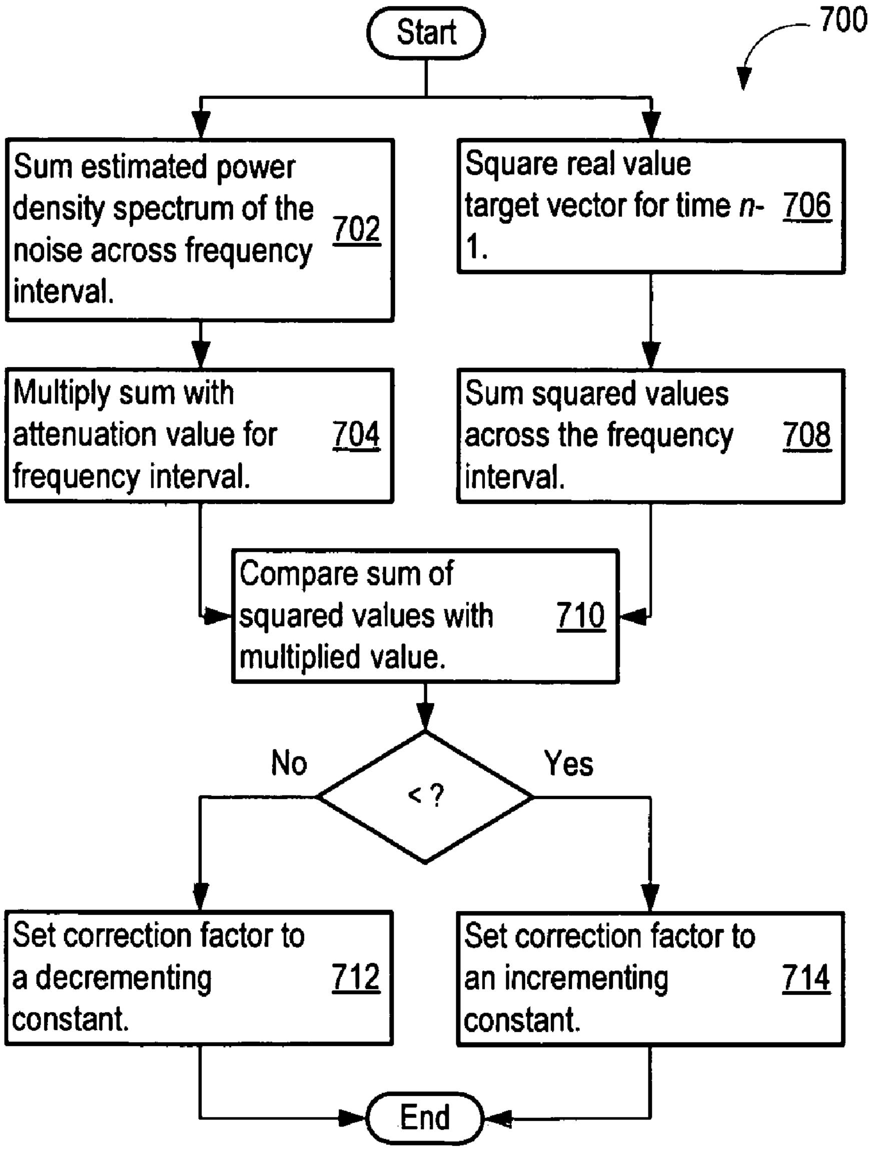
FIG. 7 is a flow diagram of a correction factor determination process.

FIG. 7 is a process 700 that determines a correction factor. The process 700 sums an estimated power density spectrum of noise across a frequency interval (702). The estimated power density spectrum of the noise may be determined using a temporal smoothing of the sub-band powers of a current input signal. The smoothing may be performed during speech pauses. Alternatively, a minimal statistical process may be executed that does not require a speech pause detection. The estimated power density spectrum of the noise may be represented as $\hat{S}_{bb}(\Omega_\mu,n)$. The estimated power density spectrum of the noise may be the same estimated power density spectrum of noise as used in determining a weighting function, such as in the approach presented with respect to FIG. 3. The sum may be $$\sum_{\mu=\mu_0}^{\mu_1} \hat{S}_{bb}(\Omega_\mu, n).$$

The sum is multiplied with an attenuation value for the frequency interval (704). The attenuation value may be a constant. The attenuation value may correspond to the amount the target noise has fallen below the current noise within a predefined frequency interval. For example, the frequency interval may have a lower bound of $\Omega_{\mu_0}$=400 Hz and an upper bound of $\Omega_{\mu_1}$=700 Hz. The attenuation value for this interval may be $K_B$=0.13. These values may correspond to an attenuation of about 18 dB. The resulting multiplied value may be $$K_B\sum_{\mu=\mu_0}^{\mu_1} \hat{S}_{bb}(\Omega_\mu, n).$$

The process 700 obtains a real value target vector. The real value target vector may be for a previous time, such as time n−1, and may be the same real value target vector used in the approach presented with respect to FIG. 5. The real value target vector is squared (706). The real value target vector may be $B_{target}(e^{j\Omega_\mu},n-1)$, and the squared value may be $B_{target}^2(e^{j\Omega_\mu},n-1)$.

The squared values are summed across the frequency interval (708). The frequency interval may be the same as the frequency interval for the estimated power density spectrum of the noise, such as that presented above. For example, the summed squared values may be $$\sum_{\mu=\mu_0}^{\mu_1} B_{target}^2(e^{j\Omega_\mu}, n-1).$$

The multiplied values are compared with the summed squared values (710). The summed squared values may be compared with the multiplied values to determine whether the summed squared values are less than the multiplied values. For example, the comparison may include determining whether $$\sum_{\mu=\mu_0}^{\mu_1} B_{target}^2(e^{j\Omega_\mu}, n-1) < K_B \sum_{\mu=\mu_0}^{\mu_1} \hat{S}_{bb}(\Omega_\mu, n).$$

Where the comparison yields a negative result, the correction factor may be set to a decrementing constant (712). For example, where the summed square values are not less than the multiplied values, the correction factor may be set to a decrementing constant. In this situation, the correction factor $\Delta_B(n)=\Delta_{dec}$. Where the comparison yields a favorable result, the correction factor is set to an incrementing constant (714). For example, where the summed square values are less than the multiplied values, the correction factor may be set to an incrementing constant. In this situation, the correction factor $\Delta_B(n)=\Delta_{ink}$. The process 700 may perform:

$$\Delta_B(n) = \begin{cases} \Delta_{ink}, & \text{if } \sum_{\mu=\mu_0}^{\mu_1} B_{target}^2(e^{j\Omega_\mu}, n-1) < K_B \sum_{\mu=\mu_0}^{\mu_1} \hat{S}_{bb}(\Omega_\mu, n), \\ \Delta_{dec}, & \text{else.} \end{cases}$$

The incrementing constant $\Delta_{ink}$ and the decrementing constant $\Delta_{dec}$ may fulfill:

$$0 \ll \Delta_{dec} < 1 < \Delta_{ink} \ll \infty.$$

For example, $\Delta_{dec}=0.98$ and $\Delta_{ink}=1.02$. The process 700 may not change the form of the target noise (over the frequency range), but may adapt the overall power. The adaptation may be slow so that short or fast variations of the estimated power density spectrum $\hat{S}_{bb}(\Omega_\mu,n)$ are not transferred to the target noise.

Figure 8:
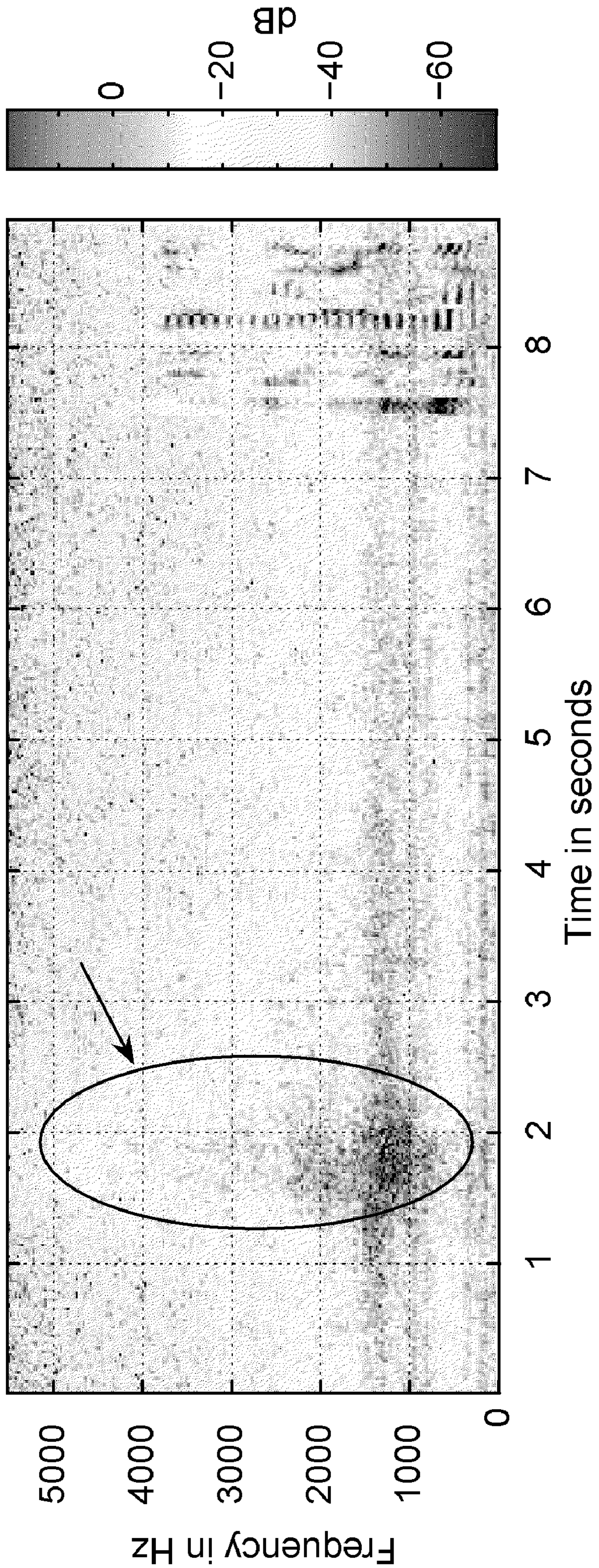
FIG. 8 is an illustration of a time-frequency analysis of a microphone signal with a non-stationary noise.

FIG. 8 illustrates a time-frequency analysis of a microphone signal with a non-stationary noise. This analysis includes a single target noise spectrum that was detected in a vehicle traveling at a speed of about 100 km/h. Within about two seconds after the monitoring event, another vehicle approaches. The second vehicle generates an additional noise as shown within the elliptic frame.

Figure 9:
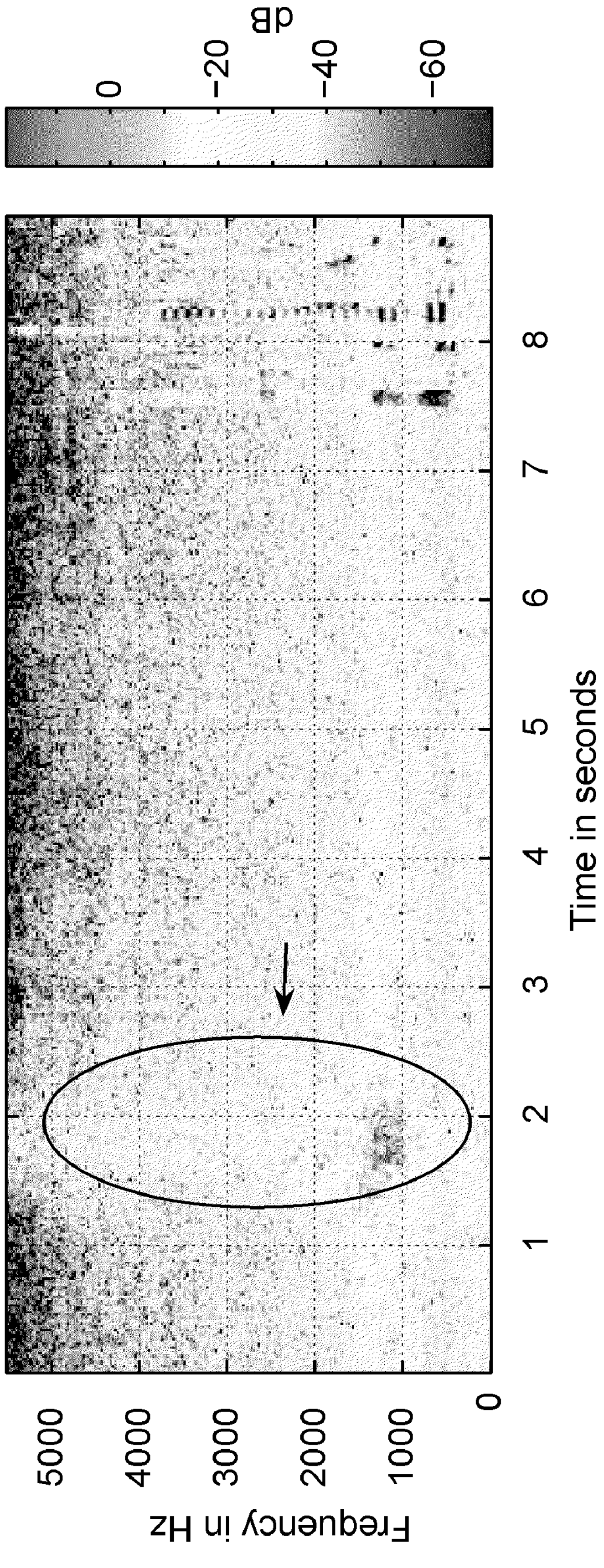
FIG. 9 is an illustration of a time-frequency analysis of a microphone signal with a non-stationary noise after a conventional noise reduction process.

FIG. 9 illustrates a time-frequency analysis of a microphone signal with a non-stationary noise after a conventional noise reduction process. The conventional noise reduction process may include the following Wiener characteristic:

$$G(e^{j\Omega_\mu}, n) = \max\left\{G_{min},\ 1 - \beta(e^{j\Omega_\mu}, n)\frac{\hat{S}_{bb}(\Omega_\mu, n)}{\hat{S}_{yy}(\Omega_\mu, n)}\right\},$$

where $G_{min}$ is constant and equal to about 0.3. As highlighted in the elliptic frame, only part of the non-stationary noise has been removed.

Figure 10:
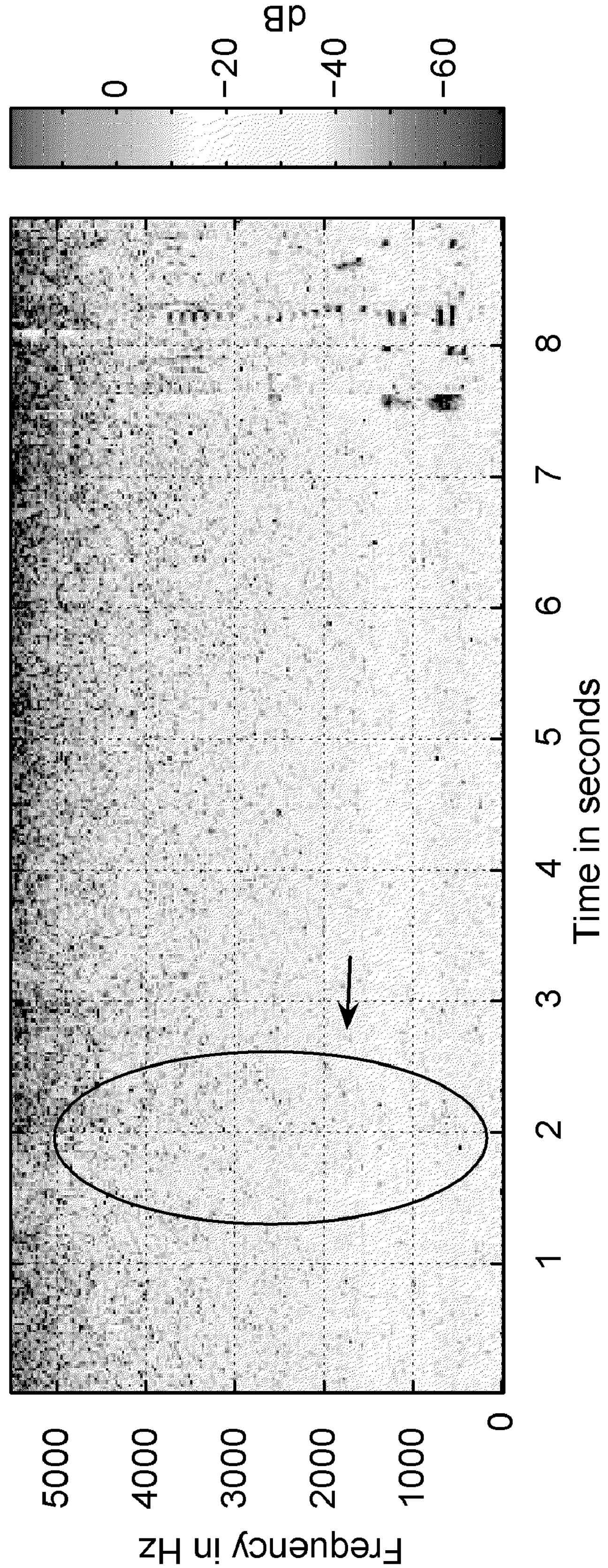
FIG. 10 is an illustration of a time-frequency analysis of a microphone signal with a non-stationary noise after a frequency-dependent weighting noise reduction process.

FIG. 10 illustrates a time-frequency analysis of a microphone signal with a non-stationary noise after a frequency-dependent weighting noise reduction process. The frequency-dependent weighting noise reduction process followed the examples described above and used the values described above, e.g. M=256, r=64, $G_0=0.5$, $G_1=0.05$, $\gamma=0.7$, $K_G=0.5$, $\Omega_{\mu_0}=400$ Hz, $\Omega_{\mu_1}=700$ Hz, $K_B=0.13$, $\Delta_{dec}=0.98$, and $\Delta_{ink}=1.02$. As highlighted in the elliptic frame, the frequency-dependent weighting noise reduction process almost completely removed this non-stationary noise.

Figure 11:
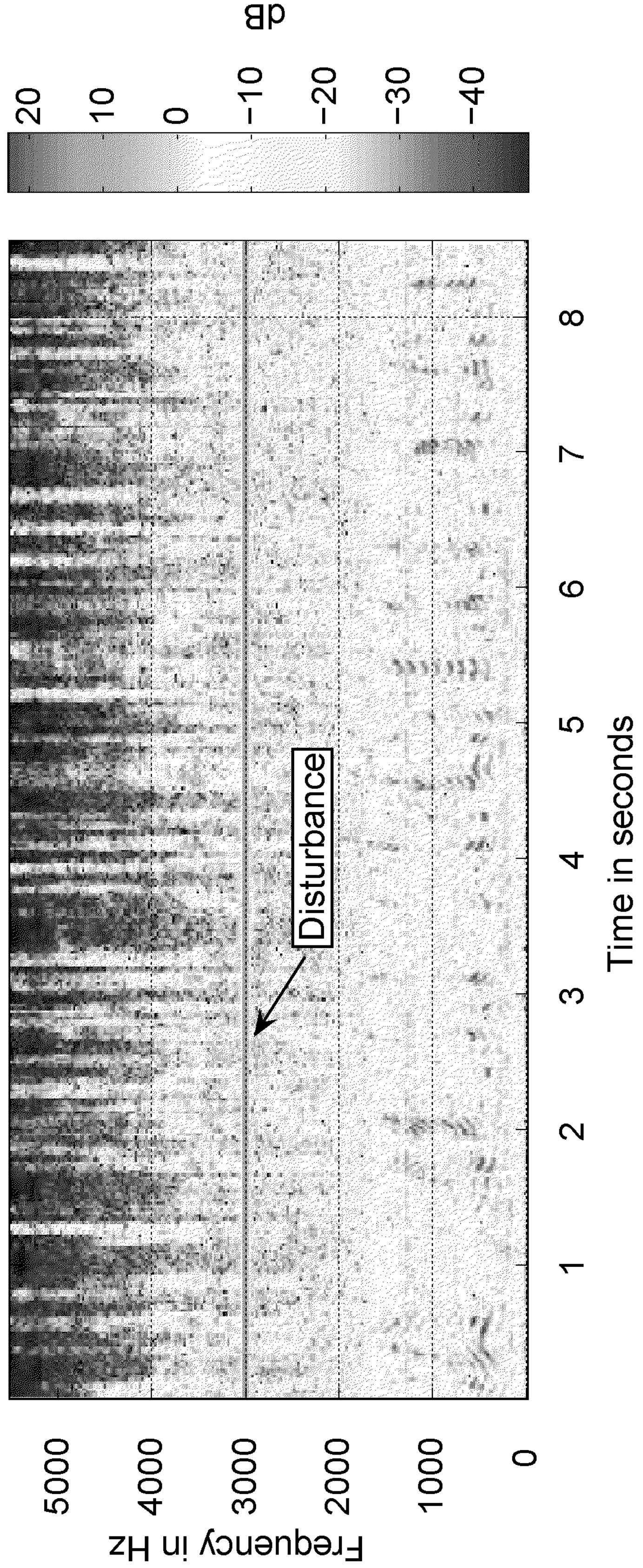
FIG. 11 is an illustration of a time-frequency analysis of a microphone signal with a tonal disturbance.
Figure 12:
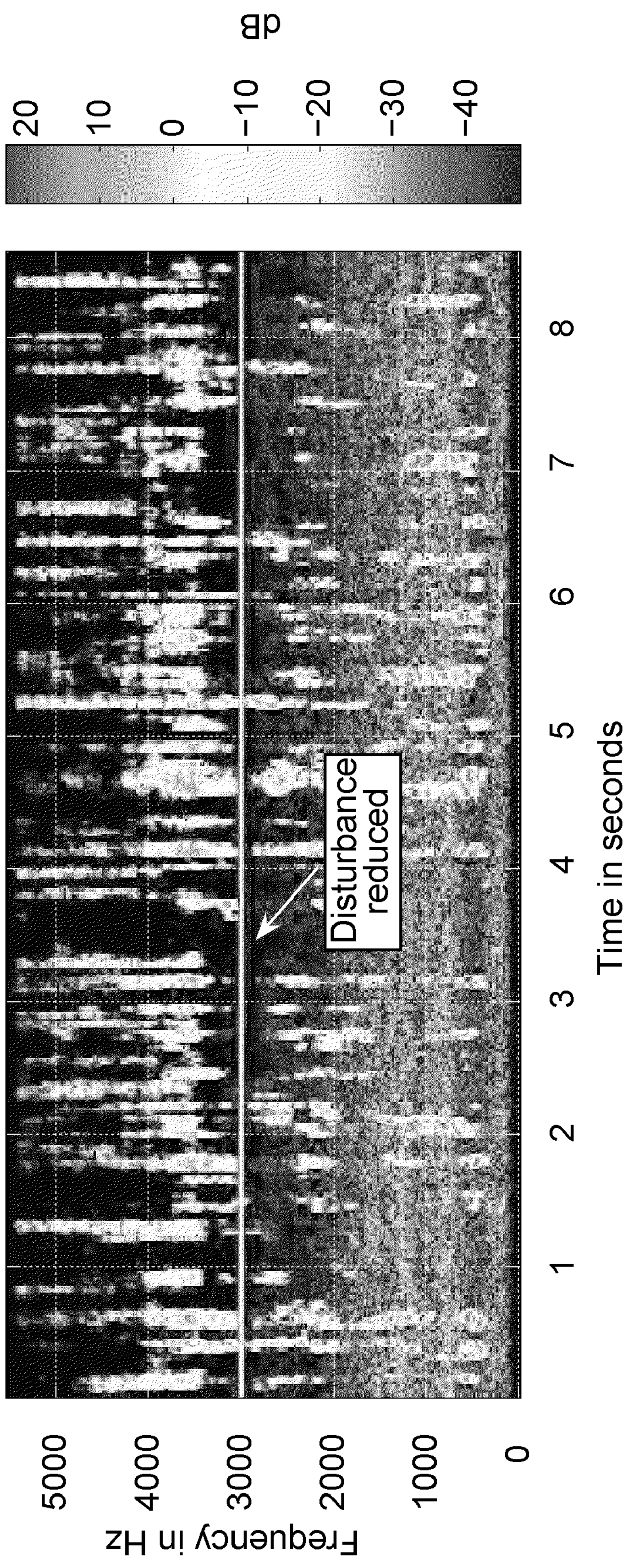
FIG. 12 is an illustration of a time-frequency analysis of a microphone signal with a tonal disturbance after a conventional noise reduction process.
Figure 13:
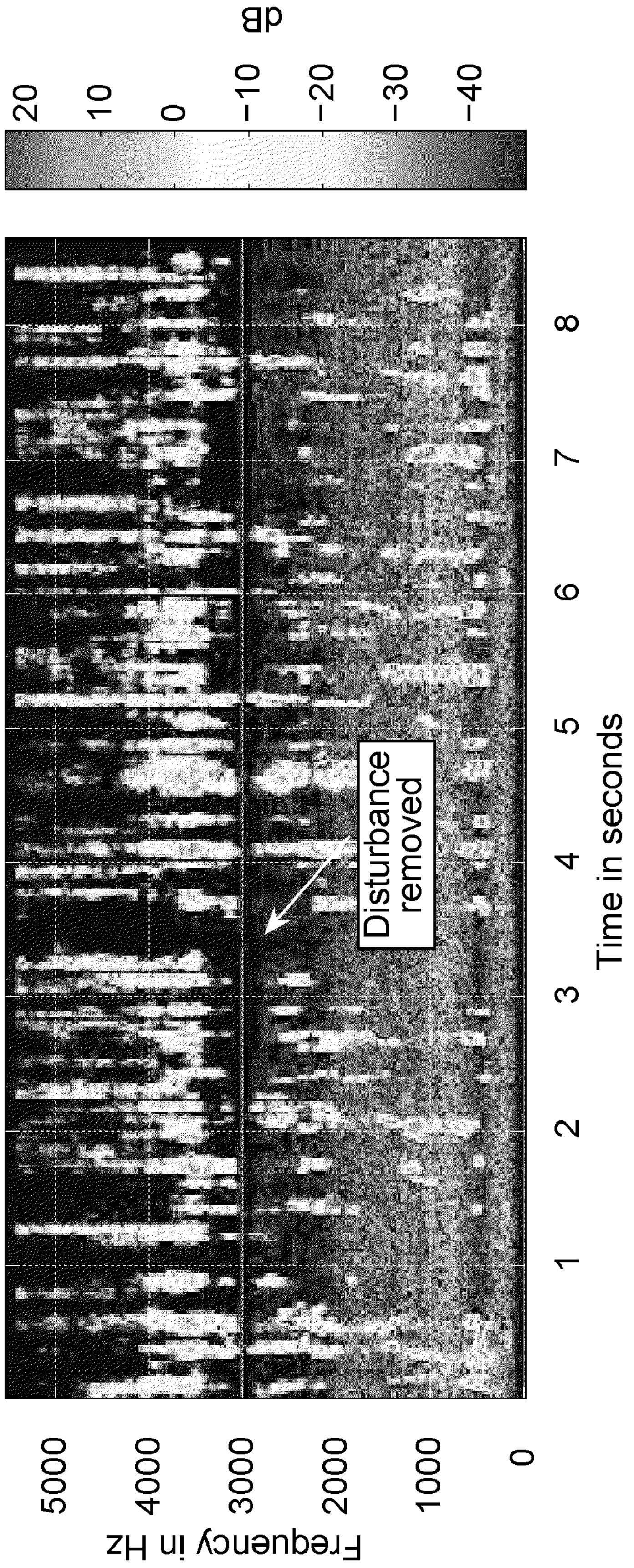
FIG. 13 is an illustration of a time-frequency analysis of a microphone signal with a tonal disturbance after a frequency-dependent weighting noise reduction process.

FIG. 11 is an illustration of a time-frequency analysis of a microphone signal with a tonal disturbance. The arrow points to a tonal disturbance at about 3,000 Hz in a microphone signal. FIG. 12 is an illustration of a time-frequency analysis of a microphone signal with a tonal disturbance after a conventional noise reduction process. The conventional noise reduction process may be the same as that used in the approach described with respect to FIG. 9. The conventional noise reduction method slightly reduces the noise illustrated in FIG. 11 by about 10 to about 15 dB. FIG. 13 is an illustration of a time-frequency analysis of a microphone signal with a tonal disturbance after a frequency-dependent weighting noise reduction process. The frequency-dependent weighting noise reduction process may be the same as that used in the approach described with respect to FIG. 10. The frequency-dependent weighting noise reduction process removes this tonal noise almost completely.

Figure 14:
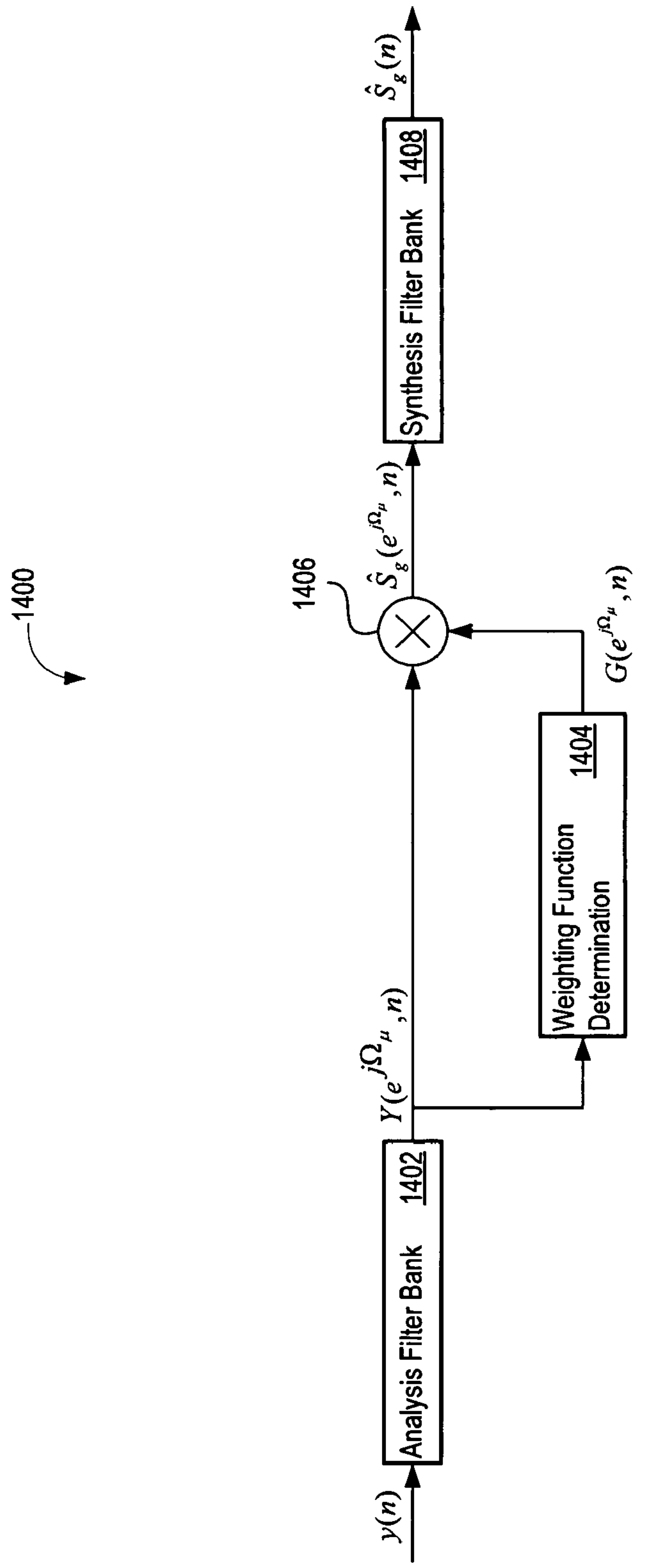
FIG. 14 is a system for noise reduction.

FIG. 14 is a noise reduction system 1400. The system 1400 may be implemented in a hands-free telephony system, a hands-free speech recognition system, a portable system, or other system. These systems may be integrated with or used in a vehicle cabin or other enclosed or partially enclosed area.

An acoustic signal may be recorded by one or more microphones resulting in a discretized microphone signal y(n). The signal y(n) may pass through one or more filters before arriving at the analysis filter bank 1402. The analysis filter bank may convert the signal y(n) into its frequency domain components and may produce input sub-band signals or short-time spectra $Y(e^{j\Omega_\mu},n)$.

A weighting function determination module 1404 receives the input sub-band signals or short-time spectra $Y(e^{j\Omega_\mu},n)$. The weighting function determination module 1404 may calculate a weight for different frequency sub-bands and/or for different time values. The weighting function determination module 1404 produces a weighting function $G(e^{j\Omega_\mu},n)$.

A multiplication module 1406 receives the input sub-band signals or short-time spectra $Y(e^{j\Omega_\mu},n)$ and the weighting function $G(e^{j\Omega_\mu},n)$. The multiplication module 1406 may multiply the sub-band signals with the weighting function. The multiplication module 1406 produces sub-band signals $\hat{S}_g(e^{j\Omega_\mu},n)$.

A synthesis filter bank 1408 receives the sub-band signals $\hat{S}_g(e^{j\Omega_\mu},n)$. The synthesis filter bank 1408 may combine the sub-band signals. The synthesis filter bank 1408 produces an output signal $\hat{S}_g(n)$. This output signal $\hat{S}_g(n)$ may be filtered and/or analyzed for speech recognition.

Figure 15:
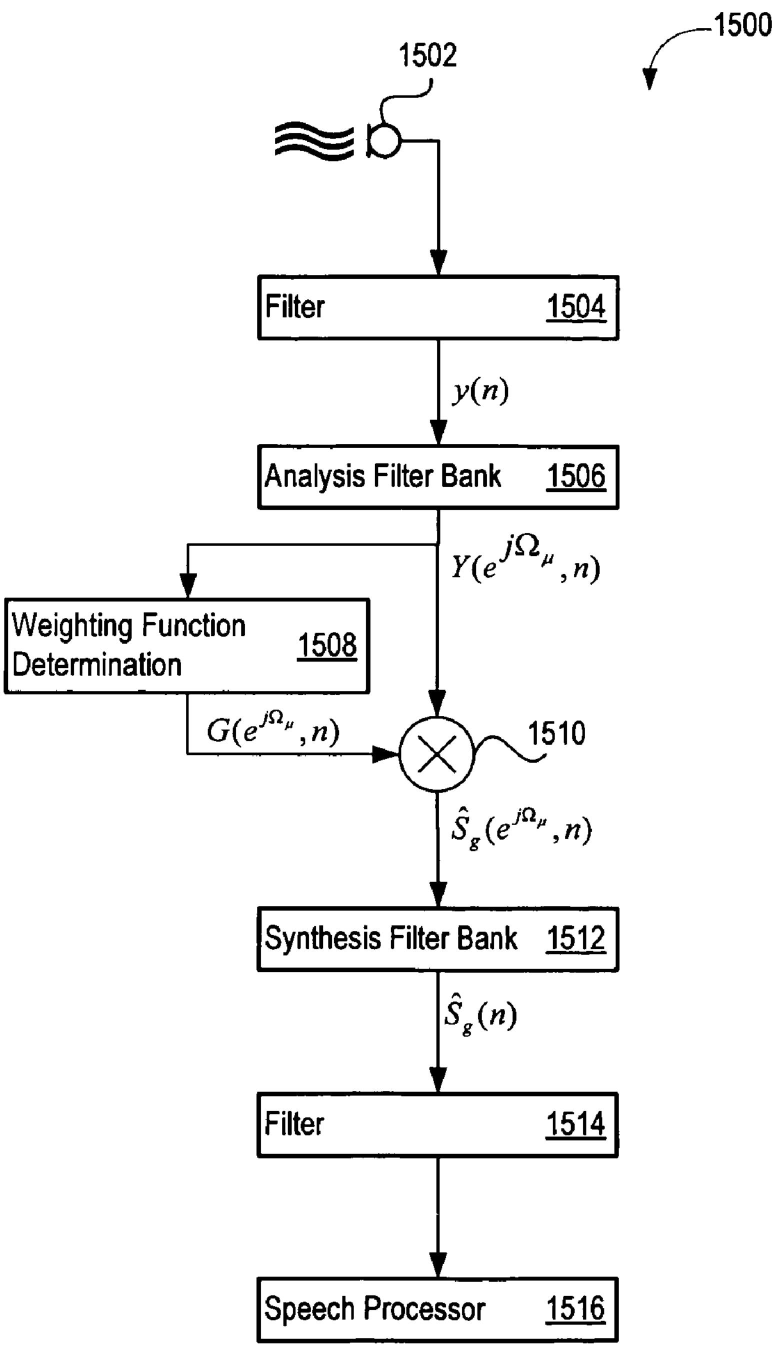
FIG. 15 is a system for speech processing.

FIG. 15 is a speech processing system 1500. The system 1500 receives sound through one or more microphones 1502 and converts the sound into an acoustic signal. The acoustic signal may be processed by a filter 1504. The filter 1504 may attenuate elements of the signal above a frequency, below a frequency, or above and below a frequency range. The filter 1504 may beamform the signal. The analysis filter bank 1506, the weighting function determination module 1508, the multiplication module 1510, and the synthesis filter bank 1512 may perform processing according to the analysis filter bank 1402, the weighting function determination module 1404, the multiplication module 1406, and the synthesis filter bank 1512, respectfully. The filter 1514 may perform additional processing to the output signal. The filter 1514 may process the signal with a high-pass, low-pass, or band-pass filter. The speech processor 1516 may perform speech recognition or voice activation functions based on the output signal. The speech processor 1516 may activate, manipulate, and/or control a device.

Figure 16:
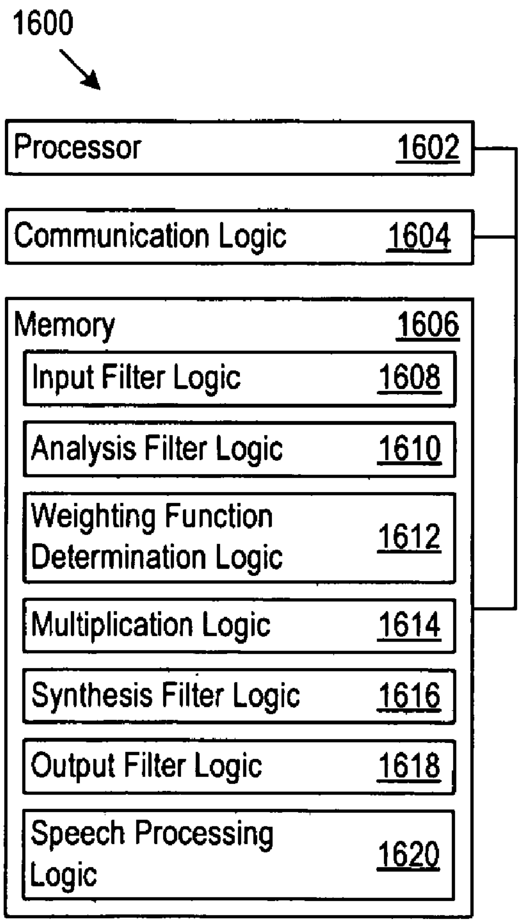
FIG. 16 is a second system for speech processing.

FIG. 16 is a second system 1600 for speech processing. The system 1600 includes a processor 1602, communication logic 1604, and a memory 1606. The memory 1606 may include input filter logic 1608, analysis filter logic 1610, weighting function determination logic 1612, multiplication logic 1614, synthesis filter logic 1616, output filter logic 1618, and speech processing logic 1620.

The system receives an input signal through the communication logic 1604. The input signal may be a digital signal generated by one or more microphones. The signal may be processed by the processor 1602 accessing input filter logic 1608 from the memory 1606. The input filter logic 1608 may perform processing according to the input signal filtering presented in step 104 of FIG. 1. The signal may be processed by the processor 1602 accessing analysis filter logic 1610. The analysis filter logic 1610 may perform processing according to the analysis filtering presented in step 202 of FIG. 2.

The signal may be processed by the processor 1602 accessing weighting function determination logic 1612. The weighting function determination logic 1612 may perform processing according to the weighting function determination presented in step 204 of FIG. 2. The signal may be processed by the processor 1602 accessing the multiplication logic 1614. The multiplication logic 1614 may perform processing according to the multiplication presented in step 206 of FIG. 2.

The signal may be processed by the processor 1602 accessing synthesis filter logic 1616. The synthesis filter logic 1616 may perform processing according to the synthesis filtering presented in step 208 of FIG. 2. The signal may be processed by the processor 1602 accessing output filter logic 1618. The output filter logic 1618 may perform processing according to the synthesized signal filtering presented in step 108 of FIG. 1. The signal may be processed by the processor 1602 accessing speech processing logic 1620. The speech processing logic 1620 may perform processing according to the speech recognition presented in step 110 of FIG. 1.

The invention also provides a computer program product comprising one or more computer readable media having computer-executable instructions for performing the steps of the above described methods when run on a computer. For example, the memory 1606 may be a computer readable media where logics 1608-1620 are computer-executable instructions forming a computer program product. It is to be understood that the different parts and components of the method and apparatus described above can also be implemented independent of each other and be combined in different forms. Furthermore, the above-described embodiments are to be construed as exemplary embodiments only.

The methods and descriptions of FIGS. 1-7 and 13-15 may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller or types of non-volatile or volatile memory remote from or resident to a hands-free or conference system. The memory may retain an ordered listing of executable instructions for implementing logical functions. A logical function may be implemented through digital circuitry, through source code retained in a tangible media, through analog circuitry, or through an analog source such as source that may process analog electrical or audio signals. The software may be embodied in any computer-readable medium or signal-bearing medium, for use by, or in connection with an instruction executable system, apparatus, device, resident to a hands-free system, a communication system, a home, mobile (e.g., vehicle), portable, or non-portable audio system. Alternatively, the software may be embodied in media players (including portable media players) and/or recorders, audio visual or public address systems, computing systems, etc. Such a system may include a computer-based system, a processor-containing system that includes an input and output interface that may communicate through a physical or wireless communication bus to a local or remote destination or server.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for processing an acoustic input signal to provide an output signal with reduced noise, the method comprising:

weighting the input signal using a frequency-dependent weighting function, where the weighting function is bounded below by a frequency-dependent threshold function, and wherein the weighting function represents whichever is the greater of:

i. one minus a product of a noise overestimation factor times a ratio of an estimated power density spectrum of a noise component of the input signal to an estimated power density spectrum of the input signal, and ii. the threshold function.

2. The method of claim 1, where the threshold function comprises a time-dependent function.

3. The method of claim 1 further comprising:

attempting to detect a presence of a wanted signal; and if no such wanted signal is detected, adapting the weighting function.

4. The method of claim 1, where the threshold function is based on a target noise spectrum.

5. The method of claim 4, where the target noise spectrum comprises a time-dependent target noise spectrum.

6. The method of claim 4, further comprising:

attempting to detect a presence of a wanted signal detection; and if no such wanted signal is detected, adapting the target noise spectrum.

7. The method of claim 6, where if power of the target noise spectrum at time (n−1) within a predetermined frequency interval is smaller than a predetermined attenuation factor times an estimate of the power of a noise component in the input signal at time n within the predetermined frequency interval, then the target noise spectrum at time n is incremented.

8. The method of claim 4, where the threshold function is based on the lesser of:

i. a predetermined minimum attenuation value, and ii, a quotient of the target noise spectrum and the absolute value of the input signal.

9. The method of claim 4, where the threshold function is based on at least two target noise spectra.

10. A computer program product comprising:

a memory; and weighting logic stored in the memory and operable to weight an input signal using a frequency-dependent weighting function, where the weighting function is bounded below by a frequency-dependent threshold function, and wherein the weighting function represents whichever is the greater of:

i. one minus a product of a noise overestimation factor times a ratio of an estimated power density spectrum of a noise component of the input signal to an estimated power density spectrum of the input signal, and ii. the threshold function.

11. An apparatus for processing an acoustic input signal to provide an output signal with reduced noise, comprising:

a processor operable to weight the input signal using a frequency dependent weighting function, where the weighting function is bounded below by a frequency dependent threshold function, and wherein the weighting function represents whichever is the greater of:

i. one minus a product of a noise overestimation factor times a ratio of an estimated power density spectrum of a noise component of the input signal to an estimated power density spectrum of the input signal, and ii. the threshold function.

* * * * *